Figure 1:
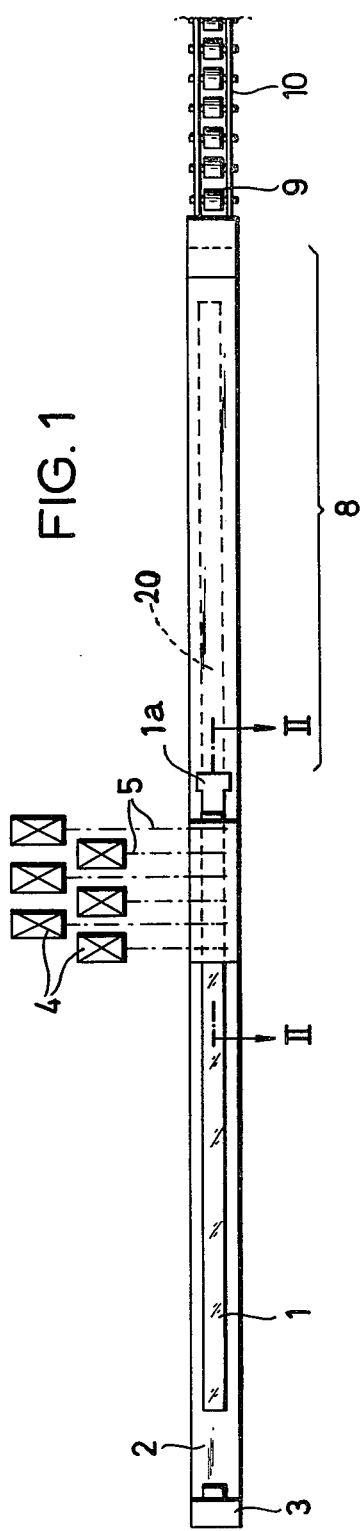

United States Patent [19]

Staat

[11] 4,147,067
[45] Apr. 3, 1979

[54] LINEAR DRIVES

[75] Inventor: Karl-Hans Staat, Dusseldorf, Fed. Rep. of Germany

[73] Assignee: Friedrich Kocks GmbH & Company, Dusseldorf, Fed. Rep. of Germany

[21] Appl. No.: 793,244

[22] Filed: May 3, 1977

Related U.S. Application Data

[63] Continuation of Ser. No. 626,316, Oct. 28, 1975, abandoned.

[51] Int. Cl.² .............................................. F16H 19/04
[52] U.S. Cl. ........................................ 74/29; 74/661
[58] Field of Search ............... 72/449; 214/1 BB, 1 F; 198/780, 472, 648; 74/29, 422, 410

[56] References Cited

U.S. PATENT DOCUMENTS

| 513,388 | 1/1894 | Gilliam | 74/422 |
| 1,884,196 | 10/1932 | Peterson | 74/422 |
| 2,476,154 | 7/1949 | Lohs | 74/422 |
| 2,788,905 | 4/1957 | Grove | 74/29 |
| 3,390,585 | 7/1968 | Henne | 74/410 |

*Primary Examiner*—Benjamin W. Wyche
*Assistant Examiner*—Wesley S. Ratliff, Jr.
*Attorney, Agent, or Firm*—Buell, Blenko & Ziesenheim

[57] ABSTRACT

A tube push bench is provided having an elongated guide bed, a toothed rack mounted in the guide bed for longitudinal displacement thereon, a mandrel rod at one end of said toothed rack driven thereby for longitudinal displacement with said rack for moving a tubular bloom, at least three drive pinions engaging said toothed rack in close packed succession and drive means driving said pinions.

4 Claims, 2 Drawing Figures

U.S. Patent

Apr. 3, 1979

4,147,067

LINEAR DRIVES

This application is a continuation of my co-pending application Ser. No. 626,316, filed Oct. 28, 1975, now abandoned.

This invention relates to linear drives and particularly to a drive for a toothed rack, e.g. for a tube push bench.

In a known drive of this type, two pinions driven by separate motors are provided, one behind the other in the longitudinal direction of the toothed rack. The two motors are arranged side-by-side in a line which extends parallel to the longitudinal direction of the toothed rack, so that the minimum distance between the motors, and thus between the drive pinions, is greater than the diameter of the motors.

This known drive has the disadvantage that the inertial mass of the movable parts is relatively great. A large inertial mass renders it very difficult to start and decelerate the drive, which is typical of a toothed rack drive. If a drive for a tube push bench is involved, the operating cycle time, and thus finally the efficiency of the push bench, are essentially co-determined by the period of time required to brake the drive and to start it again in the opposite direction. Thus, large inertial masses prolong the operating cycle times and reduce the efficiency. Furthermore, the known drive has the disadvantage that the total output of the drive has to be transmitted to the toothed rack by only two drive pinions. This results in large tooth forces and requires teeth having a large modulus. A large tooth modulus necessarily leads to a correspondingly large diameter of the drive pinions and to a correspondingly heavy construction of the toothed rack. Consequently, the toothed rack, the drive pinions, the drive shafts and their bearings have correspondingly large dimensions, thus increasing the inertial mass of the drive, which again has a disadvantageous effect on the operating cycle times and thus on the efficiency. Furthermore, a large diameter of the pinions results in a correspondingly lower rotational speed. Thus, one requires either a reduction gear or a motor having a low rotational speed. However, both these measures are more complicated technically and result in higher costs and greater inertial masses.

A feature of the present invention is to provide a rack and pinion drive, particularly for a tube push bench, which does not have the aforementioned disadvantages but by means of which it is possible to improve the efficiency of known toothed rack drives, particularly known push tube benches.

In accordance with the invention, a rack and pinion drive comprises a toothed rack, at least three closely spaced drive pinions in mesh with said rack and a separate drive motor for each pinion.

Preferably four to eight drive pinions are provided to mesh into the teeth of the toothed rack closely one behind the other.

Thus, the required total output of a substantially larger number of electric motors is applied, so that the individual motors have significantly smaller dimensions and the total of the inertial masses of all these motors is considerably smaller than that of the known construction. Thus, the drive in accordance with the invention can be decelerated more rapidly and more rapidly started in the opposite direction, thus shortening the operating cycle times and improving the efficiency. Since the outputs of the individual motors are smaller than in the known construction, smaller tooth forces also appear at the individual drive pinions and render it possible to use teeth having a smaller modulus. This results in smaller pinion diameters and smaller teeth on the toothed rack, so that the weights and the inertial masses of the toothed rack and also of the motor are smaller than in the known drive, thus further shortening the operating cycle times which are obtainable and improving the efficiency. The smaller pinions rotate at a higher speed, thus rendering it possible to use smaller motors, and there is no need to provide a reduction gear. The advantageous results are lower costs, less technical complication, and a smaller inertial mass.

In a preferred embodiment of the invention, the drive motors of the individual pinions are commonly arranged on one side of the toothed rack and are alternately offset in the longitudinal direction of their drive shafts. This has the advantage that one side of the toothed rack and thus, for example, one side of the tube push bench remains free and is easily accessible, thus facilitating manufacture and repairs. The alternately offset arrangement of the drive motors enables the latter to be installed in a confined space and also means that the distance between the drive pinions can be kept small. Thus, the length of the toothed rack is minimized, which in turn has the advantageous effect of reducing the inertial mass.

Figure 2:
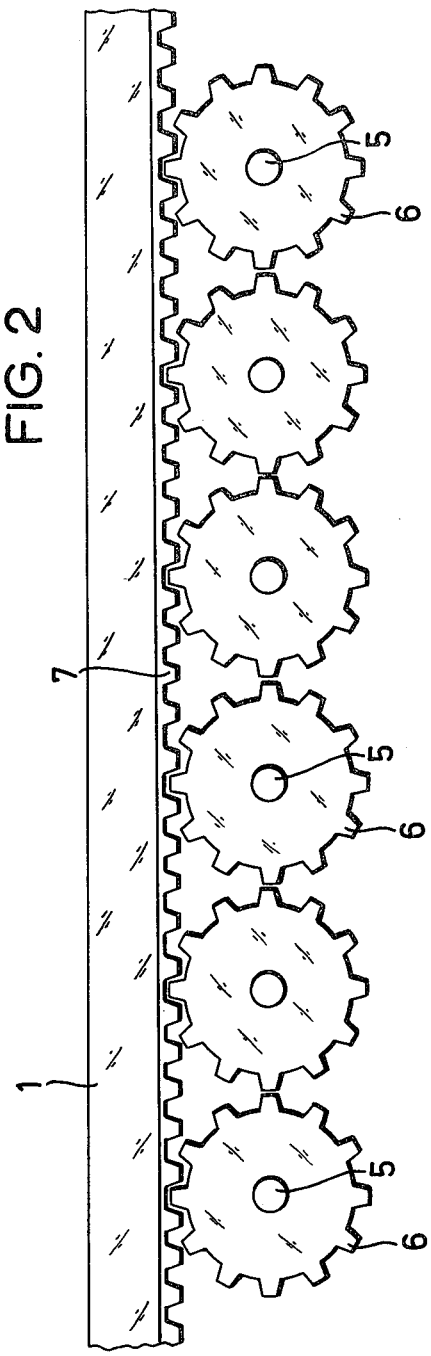

The invention will be further described, by way of example, with reference to the accompanying drawings, in which:

FIG. 1 is a plan view of a tube push bench having a rack and pinion drive in accordance with the invention; and FIG. 2 is a section taken on the line II—II of FIG. 1.

Referring to FIG. 1, a toothed rack 1 is mounted and longitudinally displaceably guided in guide bed 2. A safety device designated 3 limits the axial movement of the toothed rack 1 beyond the guide bed 2. The toothed rack 1 is driven by six motors 4 which are arranged commonly on one side of the push bench but alternately offset or staggered relatively to one another. The motors rotate drive pinions 6 (shown in FIG. 2) directly by way of drive shafts 5. The drive pinions 6 engage the teeth 7 of the toothed rack 1. The teeth 7 are located on the underside of the toothed rack 1, and the drive pinions 6 are also arranged below toothed rack 1. The toothed rack 1 drives a mandrel rod 1a which, together with a tubular bloom 20, is introduced from the side into the push bench in the region 8, the tubular bloom being pushed through a cogging rod bed 10 equipped with roller sizing passes 9, the tubular bloom thus being deformed.

While I have illustrated and described certain preferred embodiments and practices of my invention in the foregoing specification, it will be obvious that this invention may be otherwise embodied within the scope of the following claims.

I claim:

1. A tube push bench fitted with a rack and pinion drive comprising an elongated guide bed, a single gear rack having teeth on one side mounted in said bed for longitudinal displacement thereon, a mandrel rod at one end of said toothed rack driven thereby for longitudinal displacement with said rack for moving a bloom, at least three substantially identical drive pinions simultaneously engaging said teeth of said toothed rack in close packed succession with the distance between adjacent pinion axes being substantially equal to the sum of the radii of the adjacent pinions and separate drive means driving each of said pinions said separate drive means being arranged in staggered manner on one side of the gear rack with the pinion axes parallel to one another.

2. A tube push bench assembly as claimed in claim 1 having stop means on the guide bed opposite the mandrel limiting movement of the rack in one direction.

3. A tube push bench assembly as claimed in claim 1 in which the drive means are motors arranged on one side of the guide bed in staggered relation.

4. A tube push bench assembly as claimed in claim 1 having between three to eight pinions engaging the rack.

* * * * *